United States Patent
Ranney et al.

(10) Patent No.: US 9,885,784 B2
(45) Date of Patent: Feb. 6, 2018

(54) METHOD AND SYSTEM FOR DETECTING MAN-MADE OBJECTS USING POLARIMETRIC, SYNTHETIC APERTURE RADAR IMAGERY

(71) Applicant: U.S. Army Research Laboratory, Adelphi, MD (US)

(72) Inventors: Kenneth Irving Ranney, Rockville, MD (US); David Chun Wong, Clarksville, MD (US); Tuan That Ton, Springfield, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 423 days.

(21) Appl. No.: 14/563,270

(22) Filed: Dec. 8, 2014

(65) Prior Publication Data

US 2018/0003815 A1   Jan. 4, 2018

(51) Int. Cl.
*G01S 13/90* (2006.01)
*G01S 13/88* (2006.01)

(52) U.S. Cl.
CPC ............ *G01S 13/90* (2013.01); *G01S 13/887* (2013.01)

(58) Field of Classification Search
CPC .................... B64G 2001/1035; G01S 13/90
USPC .............................................. 342/25 R, 25 F
See application file for complete search history.

(56) References Cited

U.S. PATENT DOCUMENTS

| | | | |
|---|---|---|---|
| 6,750,805 B1 * | 6/2004 | Cameron | G01S 7/024 342/195 |
| 8,125,370 B1 * | 2/2012 | Rogers | G01S 7/025 342/25 F |
| 9,395,437 B2 | 7/2016 | Ton et al. | |
| 2005/0010621 A1 * | 1/2005 | Pinto | H04N 9/045 708/200 |

(Continued)

OTHER PUBLICATIONS

Mpriyame, T. et al., "A Study on Extraction of Urban Areas from Polarimetric Synthetic Aperture Radar image," Proceedings of the 2004 IEEE International Geoscience and Remote Sensing Symposium, pp. 703-706.

(Continued)

*Primary Examiner* — Peter M Bythrow
*Assistant Examiner* — Nuzhat Pervin
(74) *Attorney, Agent, or Firm* — Eric Brett Compton (57) ABSTRACT

A system and method for locating a man-made object comprising a transmitter and receiver combination or transceiver configured to emit mixtures of polarizations comprising HH, VV, VH and or HV polarization images, at least one processor configured to form co-polarimetric and cross-polarimetric images, to select a pixel under test and analyze the surrounding pixels by performing spatial averaging using the cross polarimetric image, and to replace the pixel under test and the pixels adjacent thereto with an average pixel value calculated from the pixel under test and pixels adjacent thereto; the at least one processor configured to diminish background effects to produce clearer co-polarimetric and cross-polarimetric images and to locate the left-right point of symmetry indicative of a man-made object by comparing each pixel under test in the cross-polarimetric image to pixels in the vicinity to locate an intensity differential in excess of 3 dB.

18 Claims, 4 Drawing Sheets

(56) References Cited

U.S. PATENT DOCUMENTS

2013/0229525 A1* 9/2013 Nagaoka ............... G08G 1/163
348/148
2013/0328860 A1* 12/2013 Swart ................... H04N 9/3182
345/419

OTHER PUBLICATIONS

Nshiem, S.V., et al., "Symmetry Properties in Polarimetric Remote Sensing," Radio Science, vol. 27, No. 5, Sep.-Oct. 1992, pp. 693-711.

Wolfgang-Martin Boehner, "Basic Concepts in Radar Polarimetry" Polsarpro V3.0—Lecture Notes, http://earth.esa.int/landtraining07/polsar_basic_concepts.pdf (circa 2007).

Novak, L.M., et al, "Optimal Polarimetric Processing for Enhanced Target Detection," IEEE Transactions on Aerospace and Electronic Systems, vol. 29, No. 1, Jan. 1993, pp. 234-244.

Zhang, L., et al. "Comparison of Methods for Target Detection and Applications Using Polarimetric SAR Image," PIERS Online, vol. 4, No. 1, 2008, pp. 140-145.

Novak, L., et al., "Optimal Speckle Reduction in Polarimetric SAR Imagery," IEEE Transactions on Aerospace and Electronic Systems, vol. 26, No. 2, Mar. 1990, pp. 293-305.

Banerjee, A., et al., "Adaptive Target Detection in Foliage-Penetrating SAR Images Using Alpha-stable Models," IEEE Transactions on Image Processing, vol. 8, No. 12, 1999, pp. 1823-1831.

Williams, M,. et al. "Demonstration of Reduced False Alarm Rates using Simulated L-Band Polarimetric SAR Imagery of Concealed Targets," Proceedings of 2003 IEEE International Radar Conference, 2003, pp. 535-540.

Cloude SR, Pottier E., "A review of target decomposition theorems in radar polarimetry," IEEE Trans on Geoscience and Remote Sensing. Mar. 1996;34(2):498-518.

Nghiem SV, Yueh SH, Kwok R, Li FK, "Symmetry properties in polarimetric remote sensing," Radio Science. Sep.-Oct. 1992;27(5):693-711.

Wolfgang-Martin Boehner, "Basic Concepts in Radar Polarimetry" Polsarpro V3.0—Lecture Notes, http://earth.esa.int/landtraining07/polsar_basic_concepts.pdf (circa 2007).

Pottier, Eric, et al. "Polsarpro V3.0—Lecture Notes 1—Advanced Concepts" (circa 2007).

Simms, Janet E., "Applications of Synthetic Aperture Radar (SAR) to Unexploded Ordnance (UXO) Delineation," ERDC/GSL TR-03-15, US Army Corps of Engineers, Engineering Research and Development Center, Aug. 2003.

D.Liao and T. Dogaru, "Full-Wave Characterization of Rough Terrain Surface Scattering for Forward-Looking Radar Applications," IEEE Transactions on Antennas and Propagation, vol. 60, No. 8, Aug. 2012, pp. 3853-3866.

D. Liao, T. Dogaru, A. Sullivan, "Large-Scale, Full-Wave-Based Emulation of Step-Frequency Forward-Looking Radar Imaging in Rough Terrain Environments," Sensing and Imaging, vol. 15, Issue 1, Apr. 2014.

El-Darymli K, McGuire P, Power D, Moloney C. "Target detection in synthetic aperture radar imagery: a state-of-the-art survey.," SPIE Journal of Applied Remote Sensing. 2013;7:071598-1-071598-35.

V. Alberga, E. Krogager, M. Chandra, and G. Wanielik, "Potential of coherent decompositions in SAR polarimetry and interferometry," Proceedings of the 2004 IEEE Geoscience and Remote Sensing Symposium, IGARSS '04, vol. 3, Sep. 20-24, 2004, pp. 1792-1795.

\* cited by examiner

METHOD AND SYSTEM FOR DETECTING MAN-MADE OBJECTS USING POLARIMETRIC, SYNTHETIC APERTURE RADAR IMAGERY

STATEMENT OF GOVERNMENT INTEREST

The invention described herein may be manufactured, used, and licensed by or for the United States Government without the payment of royalties.

REFERENCE TO A COMPUTER PROGRAM LISTING

Reference is made to the computer program listing accompanying this application that is herein incorporated by reference.

BACKGROUND OF THE INVENTION

The present invention relates to polarimetric synthetic aperture radar. The synthetic aperture radar image is a two-dimensional image, with the two dimensions corresponding to cross-range (azimuth or travel direction) and slant-range (or lateral); each being perpendicular to each other. Synthetic aperture radar frequently uses a platform and the synthetic aperture correlates to the distance the SAR platform covers during the period in which a target can be observed from the forward extent of the azimuth view angle on the platform's approach to the aft extent of the azimuth view angle upon its departure. In addition, the electromagnetic radiation produced by synthetic aperture radar has a polarization. Such polarization is useful for identification of materials. Symmetric, man-made objects produce very different synthetic aperture radar (SAR) signatures when examined using different polarizations. This is especially noticeable when these objects are metal. By using radar pulses with a mixture of polarizations and receiving antennas with a specific polarization, different images can be collected from the same series of radar pulses.

The present invention also relates to detection of man-made objects. Since manmade objects often exhibit "left-right" symmetry not found in nature, sensors capable of detecting "left-right" symmetry have the capability of distinguishing manmade (symmetric) objects from naturally occurring (asymmetric) objects.

Detection of objects with specific sizes and shapes is disclosed in U.S. Pat. No. 8,125,370 ('370 patent) to Rodgers, et al, hereby incorporated by reference. The '370 patent discloses a method for processing a polarimetric synthetic aperture radar (SAR) image of a region in order to screen large areas to identify candidate pixels that correspond to a position in the image that contains a candidate object. To obtain polarimetric SAR images, the system disclosed in the '370 patent transmits and receives pulses with both horizontal and vertical polarization. Polarimetric SAR imagery consists of two, three or four independent channels of complex data (amplitude plus phase) consisting of HH (Horizontal transmit, Horizontal receive), HV (Horizontal transmit, Vertical receive), VV (Vertical transmit, Vertical receive), and VH (Vertical transmit, Horizontal receive). For a fully polarimetric or quad-polarization SAR system (four channels), all four combinations HH, HV, VV and VH are employed.

The processing of different polarizations is particularly useful when metal objects are encountered. For example, a co-pol (HH or VV) response will be very high in the pixels containing a metal object's points of "left-right" symmetry. This could include multiple downrange pixels, depending on the target size and image pixel size. Such pixels could represent, for example, the centers of unexploded ordinances, Explosively Formed Penetrators (EFPs), or even the centers of trihedrals. The cross-pol response, on the other hand, will be very small in the same image pixels. It is an object of the present invention to exploit this physical phenomenon to enhance the target response from symmetric, man-made objects.

SUMMARY OF THE INVENTION

The present invention is directed to a system for detecting symmetric objects using fully polarimetric, synthetic aperture radar (SAR) imagery. While other inventions exploit calculated parameters of various representations of the polarization state, the present invention operates directly on the measured co- and cross-polarization data, utilizing spatial averaging to reduce pixel variability, and exploits anomaly detection concepts commonly used within single SAR images.

The present invention is directed to a preferred embodiment system for determining the location of a man-made object based upon symmetry of the object comprising:

at least one of a transmitter and receiver combination or transceiver for emitting and receiving mixtures of polarizations and using receiving antennas with a specific polarization to thereby collect images from radar pulses, the receiver-transmitter mixtures of polarizations comprising horizontal-horizontal polarimetric images, vertical-vertical polarimetric images, vertical-horizontal polarimetric images and horizontal-vertical polarimetric images, at least one processor, the at least one processor configured to combine the horizontal-horizontal polarimetric images and vertical-vertical polarimetric images to form co-polarimetric images and operate on one or both of the vertical-horizontal polarimetric images and horizontal-vertical polarimetric images to form cross-polarimetric images;

the at least one processor configured to process the co-polarimetric and cross-polarimetric images individually; each of the co-polarimetric and cross-polarimetric images comprising a plurality of incrementally selected pixels under test, the at least one processor configured to select a pixel under test and analyze the surrounding pixels to determine whether a manmade object is present; the at least one processor configured to perform spatial averaging using the cross polarimetric image by replacing the pixel under test and the pixels adjacent to the pixel under test with an average pixel value calculated from the pixel under test and pixels adjacent thereto;

using the co-polarimetric image, the at least one processor configured to determine the intensity of the background of the pixel under test and the surrounding pixels in order to diminish the effect of background to produce clearer co-polarimetric and cross-polarimetric images;

the at least one processor is configured to locate the left-right point of symmetry indicative of a man-made object by comparing each pixel under test in the cross-polarimetric image to pixels in the vicinity and if the intensity of the pixel under test differs by at least 3 dB, the pixel under test is a determined to be a candidate pixel for locating a cross-range coordinate determinative of a point of symmetry indicating a man-made object.

Optionally, the at least one processor is configured such that if the pixel under test differs by at least 15 dB, the pixel under test is determined to be a candidate pixel for locating a cross-range coordinate determinative of a point of symmetry indicating a man-made object. Optionally, the at least one processor is configured to perform spatial averaging using the cross polarimetric image by replacing the pixel under test and the pixels above and below the pixel under test with an average pixel value calculated from the pixel under test and pixels located above and below the pixel under test.

Optionally, the at least one processor is configured to reduce the value of the pixel under test that is a candidate pixel for the left right point of symmetry using a normalization process using a predetermined number pixel of values in the cross-polarimetric image on both sides of the pixel under test at the left right point of symmetry to thereby reduce effects of background.

In the alternative, the at least one processor determines the intensity of the background using the pixels surrounding the pixel under test and calculating an average pixel value of the surrounding pixels in order to capture a background average for pixels on either side of the point of left-right symmetry. Optionally, the complex magnitude of each component image pixel may be utilized, thereby enabling the exploitation of spatial averaging for speckle reduction. Optionally, the polarimetric images are polarimetric SAR images, and the horizontal-horizontal polarimetric images, the vertical-vertical polarimetric images, and one or both of the vertical-horizontal polarimetric images and horizontal-vertical polarimetric images are co-registered SAR images, and a location in each of the images has a corresponding location in the other co-registered SAR images.

Alternatively, the at least one processor utilizes spatial averaging to compute a spatial average and the at least one processor is configured to divide the spatial average by the intensity of the background. The spatial average may be computed using the equation:

$$I_{filter}(x, y) = \sum_{i=0}^{N_p} I(x, y - \lfloor N_p/2 \rfloor + i)$$

where $I_{filter}(x,y)$ denotes the image from either co-polarimetric or cross polarimetric radar data pixel at (x,y), where x and y are coordinates, $N_p$ is the number of pixels used for spatial averaging, and $\lfloor N_p/2 \rfloor$ denotes the largest integer less than or equal to $N_p/2$, where $N_p$ could be equal to zero for the co-polarimetric image.

Optionally, the at least one processor is configured to refine the corresponding pixel under test in the filtered co-polarimetric image by dividing by the ratio of the spatial average to the intensity of the background. Optionally, the at least one processor, for each pixel in the filtered cross-pol image, determines the effect of background pixels in the cross polarimetric image using the equation:

$$I_{cross\ denominator}(x, y) = \sum_{i=m+1}^{M} I_{filter,cross}(x-i, y) + \sum_{i=m+1}^{M} I_{filter,cross}(x+i, y)$$

where, $I_{filter,\ cross}$ is the filtered cross-pol image and $I_{cross\ denominator}$ is used to determine the $I_{cross\ contrast}$ in the following equation where x and y are coordinates, M is the number of cross-range cells on either side of a pixel under test in the cross-polarimetric image, m is the number of guard cells on either side of the pixel under test to be skipped before calculating a background average, where m may be equal to zero, and using the image cross denominator.

Optionally, for each pixel in the cross-pol image the at least one processor calculates the contrast between the pixel under test and any high intensity values the surrounding pixels by calculating the cross image contrast using the equation:

$$I_{cross\ contrast}(x, y) = \frac{I_{filter\ cross}(x, y)}{I_{cross\ denominator}(x, y)}$$

where $I_{filter\ cross}(x,y)$ is the filtered image at coordinates (x,y), and $I_{cross\ denominator}(x,y)$ correlates to the background intensity in the cross polarimetric image at coordinates (x,y) used as a denominator and, using the cross contrast of the surrounding pixels, the at least one processor calculates a polarimetric manmade object detector output statistic $T_{PMOD}$ using the equation:

$$T_{PMOD}(x, y) = \frac{I_{filter,co}(x, y)}{I_{cross\ contrast}(x, y)},$$

where $I_{filter,\ co}(x,y)$ denotes the filtered co-pol image at coordinates (x,y).

As a further option, the at least one processor is configured to incrementally select pixels under test, determine the spatial average, determine the background intensity, use the corresponding pixel under test in the filtered co-polarimetric image and divide by the ratio of the spatial average to the intensity of the background to compile a list of statistical values indicating the likelihood of a manmade object, and compare the statistical value to the correlated value of corresponding pixel under test in the co-polarimetric image and wherein if the pixel under test value of the copolarimatric image has a larger value, it is more likely to be indicative of a manmade object. Alternatively, the at least one processor is configured to determine whether the ratio of the statistical value to the correlated value of corresponding pixel under test in the co-polarimetric image is greater than 4 dB to indicate the presence of a man-made object.

The present invention is also directed to a preferred method for determining the location of a man-made object comprising the following steps, not necessarily in order;

inputting image data comprising four co-registered polarimetric SAR images of a common scene; the four co-registered polarimetric images comprising horizontal-horizontal, horizontal-vertical, vertical-vertical and vertical-horizontal polarimetric images, the inputted image data comprising pixel values representing the polarimetric SAR images, a location in each of the four co-registered SAR images having a corresponding location in the other three co-registered SAR images;

each of the four co-registered SAR images being inputted into at least one processor, the at least one processor being configured to calculate a statistic indicating the likelihood that a manmade object is present by selecting a pixel under test and:

(i) using at least one processor, spatial averaging at a plurality of pixel locations in the vicinity of the pixel under test using the equation:

$$I_{filter}(x, y) = \sum_{i=0}^{N_p} I(x, y - \lfloor N_p/2 \rfloor + i)$$

where I(x,y) denotes the image from either co-polarimetric or cross polarimetric radar data at pixel (x,y), where x and y are coordinates, $N_p$ is the number of pixels used for spatial averaging, and $\lfloor N_p/2 \rfloor$ denotes the largest integer less than or equal to $N_p/2$, where $N_p$ could be equal to zero for the co-polarimetric image;

(ii) capturing a background average by determining the number of cross-range cells (M) on either side of a pixel under test in the cross-pol image to calculate a background average for pixels on either side of the point of left-right symmetry and then specifying m, the number of "guard" cells on either side of the pixel under test to be "skipped" before calculating this background average, where m could be equal to zero;

(iii) for each pixel in the filtered cross-pol image, calculating the quantity:

$$I_{cross\ denominator}(x, y) = \sum_{i=m+1}^{M} I_{filter,cross}(x - i, y) + \sum_{i=m+1}^{M} I_{filter,cross}(x + i, y)$$

where, $I_{filter,\ cross}$ is the filtered cross-pol image and $I_{cross\ denominator}$ is used to determine the $I_{cross\ contrast}$ in the following equation;

(iv) for each pixel in the cross-pol image calculating the quantity:

$$I_{cross\ contrast}(x, y) = \frac{I_{filter,cross}(x, y)}{I_{cross\ denominator}(x, y)}$$

(v) calculating a polarimetric manmade object detector output statistic $T_{PMOD}$ using the equation:

$$T_{PMOD}(x, y) = \frac{I_{filter,co}(x, y)}{I_{cross\ contrast}(x, y)},$$

where $I_{filter,\ co}(x,y)$ denotes the filtered co-pol image;

(vi) processing the image (two-dimensional array) of polarimetric manmade object output detector values to determine if the object under investigation is man-made.

An alternative preferred embodiment system for determining the location of a man-made object comprises:

at least one input configured to input image data comprising four co-registered SAR images of a common scene, each scene comprising a plurality of pixel values, the pixel values representing a radar cross section of the same region in each of the four basis polarizations;

at least one processor, each of the four co-registered SAR images being inputted into the at least one processor, the at least one processor being configured to calculate a statistical likelihood that a manmade object is present; the at least one processor configured to perform spatial averaging at a plurality of pixel locations according to the equation:

$$I_{filter}(x, y) = \sum_{i=0}^{N_p} I(x, y - \lfloor N_p/2 \rfloor + i)$$

where I(x,y) denotes the image from either co-polarimetric or cross polarimetric radar data at pixel (x,y), $N_p$ is the number of pixels used for spatial averaging, and $\lfloor N_p/2 \rfloor$ denotes the largest integer less than or equal to $N_p/2$, and $N_p$ possibly equal to zero for the co-polarimetric image;

the at least one processor configured to determine M, the number of cross-range cells on either side of a pixel under test in the cross-pol image in order to capture a background average for pixels on either side of the point of left-right symmetry;

the at least one processor configured to determine the number (m) of "guard" cells on either side of the pixel under test to be "skipped" before calculating this background average, where m may be equal to zero;

the at least one processor configured to calculate for each pixel in the filtered cross-polarimetric image the quantity:

$$I_{cross\ denominator}(x, y) = \sum_{i=m+1}^{M} I_{filter,cross}(x - i, y) + \sum_{i=m+1}^{M} I_{filter,cross}(x + i, y)$$

where, $I_{filter,\ cross}$ is the filtered cross-polarimetric image;

the at least one processor configured to, for each pixel in the cross-pol image, calculate the quantity:

$$I_{cross\ contrast}(x, y) = \frac{I_{filter,cross}(x, y)}{I_{cross\ denominator}(x, y)};$$

the at least one processor configured to calculate a polarimetric manmade object detector output statistic using the equation:

$$T_{PMOD}(x, y) = \frac{I_{filter,co}(x, y)}{I_{cross\ contrast}(x, y)},$$

where $I_{filter,\ co}(x,y)$ denotes the filtered co-polarimetric image; and the at least one processor configured to create a two-dimensional array of values to determine if the object under investigation is man-made.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features, and advantages of the invention will be apparent from the following more detailed description of the preferred embodiments of the invention, as illustrated in the accompanying drawings, wherein.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that the terminology left-right or left right is based upon the orientation of the image and that if the image is rotated 90 degree, left right symmetry will appear as up and down symmetry. As used herein, pixels to the side of the pixel under test are those pixels appearing adjacent to the pixel in the left right direction (or if rotated 90 degrees, then in the up and down direction).

It will be understood that, although the terms first, second, etc. may be used herein to describe various elements, these elements should not be limited by these terms. For example, when referring first and second components, these terms are only used to distinguish one component from another component.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
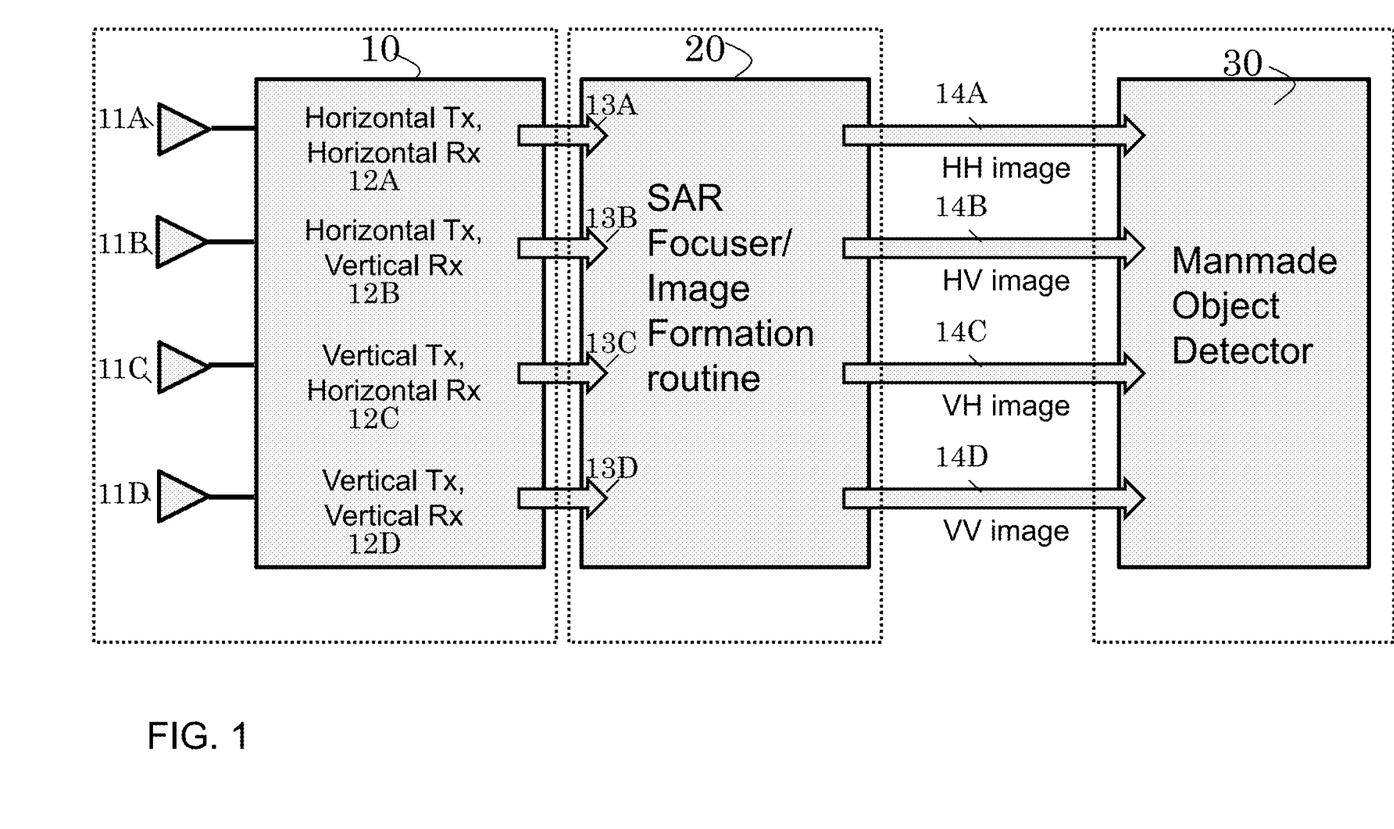
FIG. 1 is a schematic illustration of a preferred embodiment of the present invention.

FIG. 1 is a schematic block diagram of a preferred embodiment polarimetric manmade object detection system. The preferred embodiment synthetic aperture radar sensor produces imagery having sufficient down-range and cross-range resolution to ensure that one image pixel encompasses the target's point of left/right symmetry without including contributions from non-target objects. The synthetic aperture radar images—collected simultaneously at different polarizations—contain information regarding the polarization state of the target. A preferred embodiment enhances target signatures by combining of co-polarimetric (VV and HH) and cross-polarimetric (HV and VH) radar data using co-polarimetric and cross-polarimetric radar images.

The polarimetric SAR receiver 10 comprises four input/output receiver/transmitters or "basis" channels 11A to 11D for inputting data into SAR receiver sections 12A through 12D through to the SAR processor 20. The data is fully polarimetric and includes (A) horizontal antenna transmitted data which was received by a horizontal receiver antenna data (shown s horizontal Tx horizontal Rx in FIG. 1) transmitted and received at 11A, (B) horizontal antenna transmitted data which was received by a vertical receiver antenna data (shown s horizontal Tx vertical Rx in FIG. 1) transmitted and received at 11B, (C) vertical antenna transmitted data which was received by a horizontal receiver antenna data (shown as vertical Tx, horizontal Rx in FIG. 1) transmitted and received at 11C and (D) vertical antenna transmitted data which was received by a vertical receiver antenna data (shown as vertical Tx, vertical Rx in FIG. 1) transmitted and received at 11D. The synthetic aperture radar sensor produces imagery of high enough down-range and cross-range resolution to ensure that one image pixel encompasses the target's point of left/right symmetry without including contributions from non-target objects. The synthetic aperture radar images—collected simultaneously at different polarizations (A-D) contain information regarding the polarization state.

The inputted data is then focused to produce four co-registered SAR images 12A-12D of a common scene, wherein a specified pixel value represents the radar cross section (RCS) of the same patch of ground in each of the four basis polarizations. The four images are then inputted through channels 14A-14D to the polarimetric manmade object detector 30, which calculates a statistic indicating the likelihood that a manmade object is present. The polarimetric manmade object detector 30 calculates a statistic indicating the likelihood that a manmade object is present.

Figure 2:
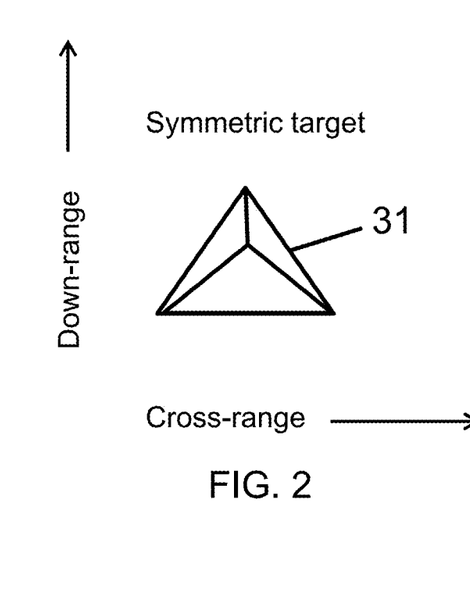
FIG. 2 is an illustration representative of the physical target having a tetrahedral shape which was detected by the polarimetric manmade object detector to detect the left-right symmetry indicative of manmade objects.
Figure 3A:
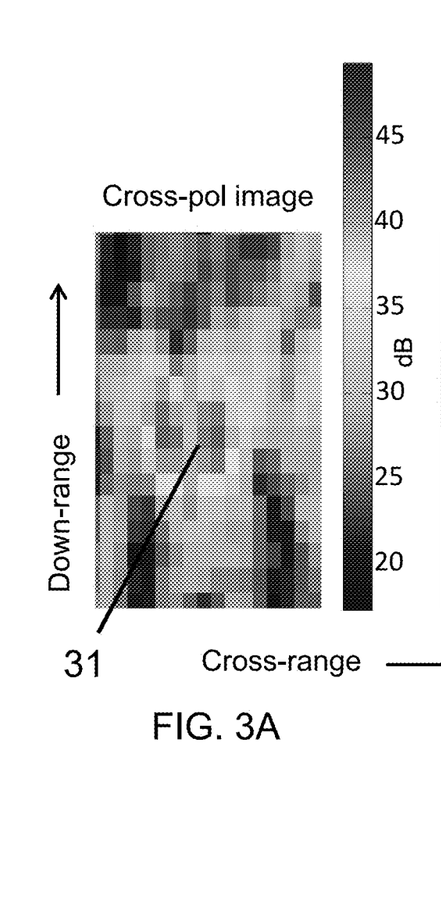
FIG. 3A is an illustration showing the cross-polarimetric image of the SAR image produced from a target represented by FIG. 2.
Figure 3B:
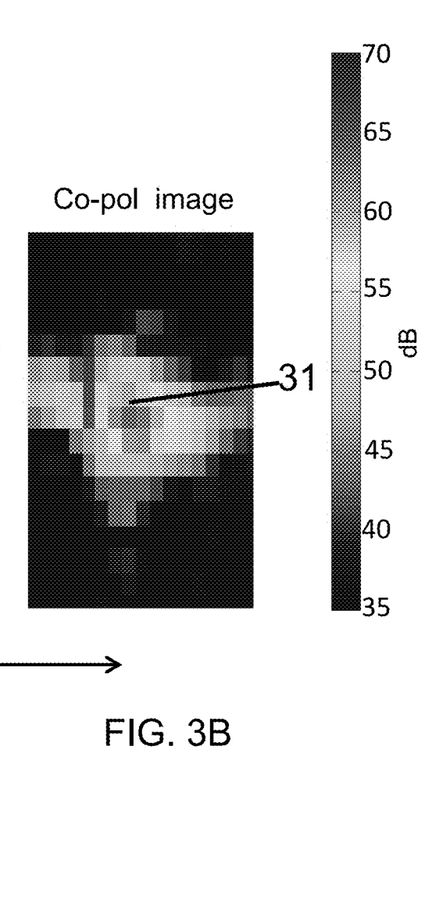
FIG. 3B is the co-polarimetric image produced by the SAR image formation software of the manmade object detector component 30. The color scales are set relative to the maximum pixel value in the image. Note the region of lower radar cross section in the cross-polarimetric image.

FIG. 2 illustrates the physical target 31 having a tetrahedral shape which was detected by the polarimetric manmade object detector to detect the left-right symmetry indicative of manmade objects, The SAR images focused using measured data are shown in FIGS. 3A and 3B. A cursory examination of the imagery reveals that the radar cross section in the cross-polarimetric image drops suddenly at the pixel with cross-range coordinate encompassing the left-right point of symmetry (shown generally as 31). This well-documented effect is precisely the phenomenon exploited by the polarimetric manmade object detector 30 to detect symmetric objects. While HH (horizontal Tx and horizontal Rx) and HV (horizontal Tx and vertical Rx) are used to illustrate the co-pol and cross-pol channel behaviors, similar co- and cross-pol behavior will be observed in the VV (vertical Tx and vertical Rx) and VH (vertical Tx and horizontal Rx) channels.

FIG. 3A is an image of the tetrahedral target under consideration (represented in FIG. 2) processed by the SAR image formation software. The color scales are set relative to the maximum pixel value in the image. FIG. 3B is the co-polarimetric image produced by the SAR image formation software of the manmade object detector component 30. The color scales are set relative to the maximum pixel value in the image. Note the region of lower radar cross section in the cross-pol image.

Figure 4:
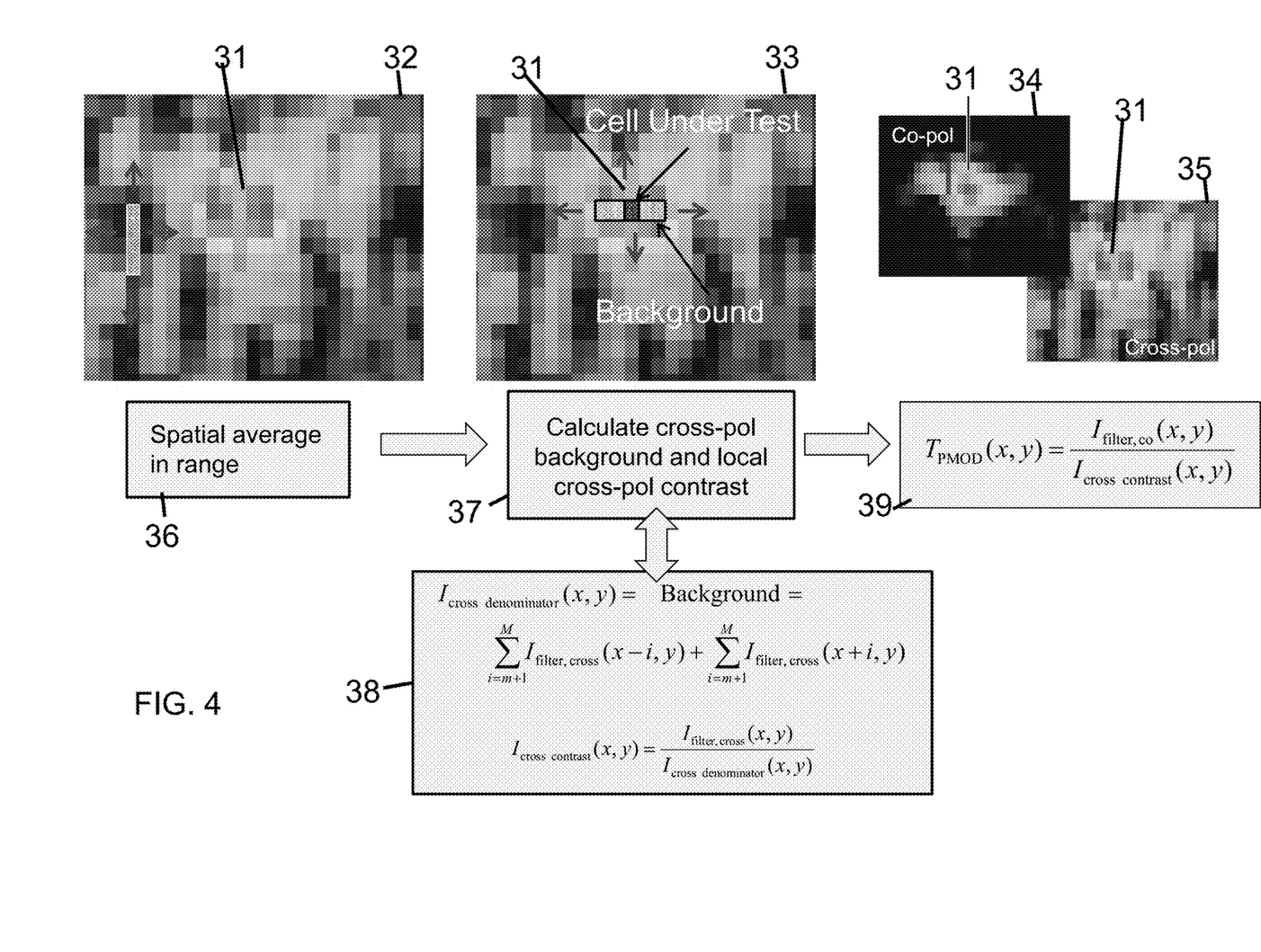
FIG. 4 is an illustration depicting the processing of the SAR image formation including the processing steps performed in block 30 (see FIG. 1) of the polarimetric manmade object detector system.

FIG. 4 depicts the processing steps of the polarimetric manmade object detector (PMOD) algorithm. From the diagrams, the polarimetric manmade object detector (PMOD) algorithm first performs spatial averaging to reduce speckle. It then reduces the value of the cross-pol pixel at the point of symmetry through normalization by stronger cross-pol values on either side of the point of symmetry. Finally, the polarimetric manmade object detector (PMOD) algorithm divides the co-pol pixel value (which is typically high for metallic, symmetric, man-made objects) by this reduced co-pol pixel value. In regions where left-right symmetry exists, the co- to cross ratio should tend to be higher. These steps can be summarized as:

(i) Select one co-pol channel (either HH or VV) and one cross-pol channel (either HV or VH) (see FIG. 1) for use by the polarimetric manmade object detector (PMOD) processor 30.

(ii) Determine the number of down-range cells, $N_p$, for use in spatial averaging for polarization p=0 (co-polarimetric) and p=1 (cross-polarimetric), and perform spatial averaging at each pixel location according to:

$$I_{filter}(x, y) = \sum_{i=0}^{N_p} I(x, y - \lfloor N_p/2 \rfloor + i), \qquad (1)$$

where I(x,y) denotes the image (either HH, VV, HV, or VH) pixel at (x,y), and $\lfloor N_p/2 \rfloor$ denotes the largest integer less than or equal to Np/2, where Np could be equal to zero for the co-polarimetric image.

(iii) specify, M, the number of cross-range cells on either side of a pixel under test (PUT) in the cross-pol image used to capture radar cross section levels (i.e., a background average) for pixels without left-right symmetry. Specify m, the number of "guard" cells on either side of the pixel under test to be "skipped" before calculating this background average, which could be equal to zero. For each pixel in the filtered cross-pol image, calculate the quantity $$I_{cross\ denominator}(x, y) = \qquad (2)$$
$$\sum_{i=m+1}^{M} I_{filter,cross}(x - i, y) + \sum_{i=m+1}^{M} I_{filter,cross}(x + i, y),$$

where, $I_{filter,\ cross}$ is the filtered cross-pol image.

(iv) For each pixel in the cross-pol image calculate the quantity (Box 38):

$$I_{cross\ contrast}(x, y) = \frac{I_{filter,cross}(x, y)}{I_{cross\ denominator}(x, y)} \qquad (3)$$

[Note that a large cross denominator is indicative of high intensity pixels in the area, which are in turn indicative of manmade object.]

(v) Calculate the polarimetric manmade object detector (PMOD) output statistic (Box 39) as:

$$T_{PMOD}(x, y) = \frac{I_{co,filtered}(x, y)}{I_{cross\ contrast}(x, y)}, \qquad (4)$$

where $I_{filter,\ co}$ (x, y) denotes the filtered co-pol image.

(vi) Process the image (two-dimensional array) of PMOD values to determine if the object under investigation is man-made.

Figure 5:
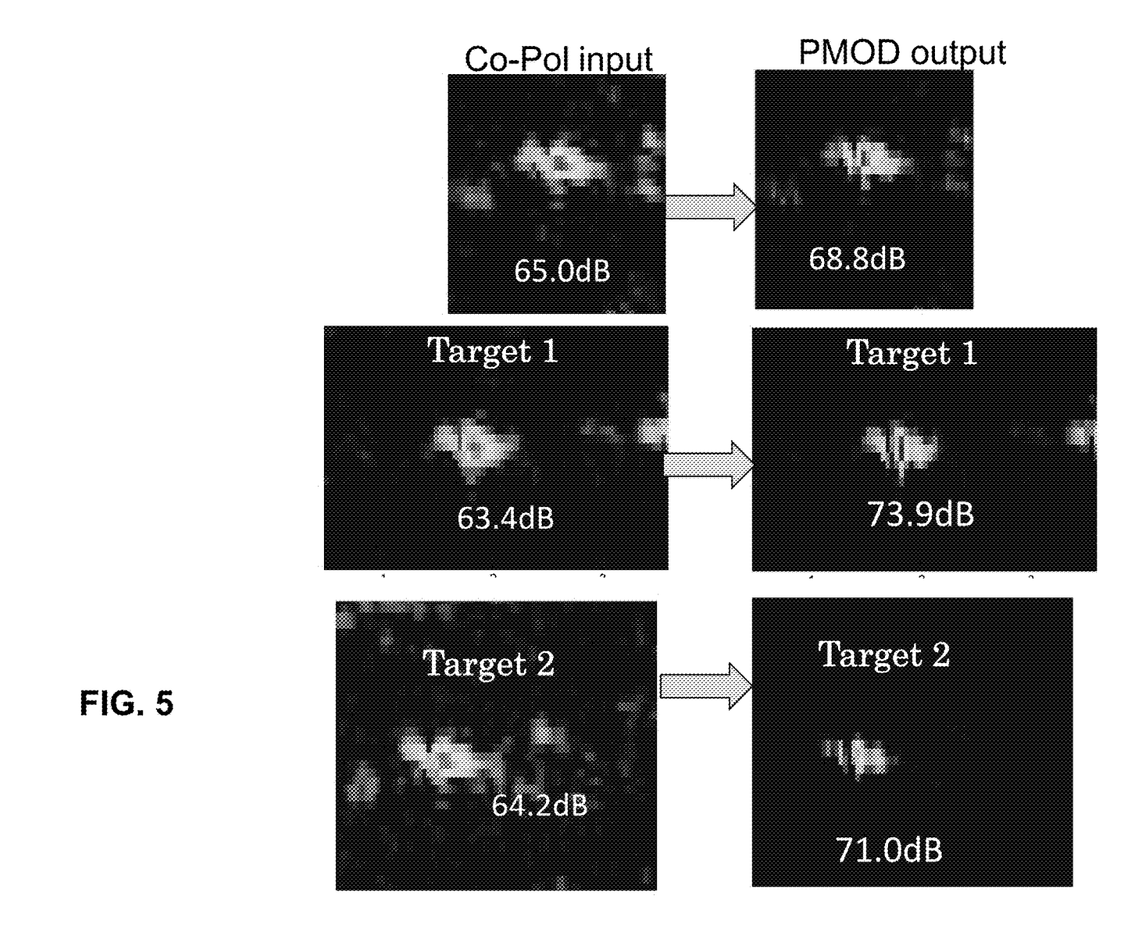
FIG. 5 is an illustration showing examples of target signature enhancement achieved by the preferred embodiments of the present invention for different target emplacement geometries. Enhancements of 10.5 dB for target 1 and 6.8 dB for target 2 are shown.

FIG. 5 illustrates the enhanced target response produced by the preferred embodiment system for different target ranges. The labels within the imagery (e.g. 65.0 dB) indicate the peak pixel value on target, and the polarimetric manmade object detection system enhances the target response by 10.5 dB (target 1) and 6.8 dB (target 2) respectively, as shown in the lower four images of FIG. 5. When a similar comparison is performed of clutter pixels, on average the polarimetric manmade object detection system-processed pixel values are within a fraction of a dB of the input co-pol pixel values. Hence, on average, an enhancement in clutter-to-target ratio is expected to be on the order of the target enhancement realized by the PMOD system. The two images on the top show results from a different data collection (wherein a difference of nearly 4 dB was observed) for the same target used to the bottom two images.

Advantages of the Invention

Various systems have already been proposed for the detection of the symmetries in fully polarimetric SAR. These systems, however, rely on the calculation of specific statistics produced by transformation of the underlying polarization states. For example, the asymmetry angle produced by polarimetric decompositions has been proposed for detection of symmetric objects in a SAR image. The value of this statistic is compared to expected values for manmade objects, and a decision is made as to whether or not a target is present in the scene. Such a method, however, is not inherently amenable to spatial averaging (i.e. speckle reduction). Hence, it is subject to the high variability commonly encountered in SAR image pixel values.

Some approaches increase the number of available SAR images by breaking the synthetic aperture into several sub-apertures, each sub-aperture producing a corresponding image of the scene. While increasing the number of images available for averaging, this approach has the side-effect of reducing the resolution in each of the new images. In addition it could also corrupt the inherent symmetry of a target object if too much squint is introduced within some of the sub-apertures. Still other methods proposed in the past combine the SAR images from each polarization channel (i.e. co-polarimetric and cross-polarimetric) to create a single image for use by downstream target detection algorithms. Such approaches have been leveraged to detect larger, tactical targets in high resolution imagery. While achieving optimum performance in terms of a specific measurement criterion, they fail to exploit the very explicit co-pol to cross-pol relationship present in symmetric, man-made objects.

The method of the preferred embodiment differs from the current state of the art in several respects. First, it operates on, inter alia, a full-aperture SAR image, thereby maintaining the highest possible underlying image resolution. Second, it utilizes the complex magnitude of each component image pixel, thereby enabling the exploitation of spatial averaging for speckle reduction. Finally, it leverages the fundamental concepts of anomaly detection to "amplify" the signal from symmetric, man-made targets while leaving signals from asymmetric, natural clutter objects essentially unchanged. This results in a greater contrast between target and non-target objects within the scene.

The present invention is designed to reduce the variability of statistics calculated to detect symmetric, man-made objects in SAR imagery. This is achieved via the incorporation of averaging and the utilization of non-coherent, magnitude data. Based on data examined to date, the algorithm increases the target-to-clutter ratio when targets are symmetric while leaving them nearly unchanged when targets are asymmetric.

The invention could also be used in imagery produced by other sensors if multiple channels are available, and the measured signals from targets of interest are larger in certain channels while remaining smaller in others. This method has, however, not yet been extended to other sensor data (such as hyperspectral or multispectral imagery).

The invention represents a novel extension of anomaly detection techniques to target detection in fully polarimetric SAR data. While SAR anomaly detection algorithms (e.g. constant false alarm rate (CFAR) prescreeners) typically operate on a single image, the present invention combines information from multiple channels to enhance the contrast between target and background.

Since manmade objects often exhibit left-right symmetry not found in nature, a sensor capable of distinguishing such symmetries effectively distinguishes manmade (symmetric) objects from naturally occurring (asymmetric) ones. The present invention comprises such a system for detecting symmetric objects in fully polarimetric, synthetic aperture radar (SAR) imagery. Other state-of-the-art systems rely on the calculation of specific statistics produced by transformation of the underlying polarization states. Since a single value is determined, typically without exploiting any sort of averaging, the result may be subject to a large amount of variance. Some approaches have addressed this problem through sub-aperture processing, thus increasing the number of available images. This approach, however, reduces the resolution of the imagery available for subsequent processing. Other methods combine the SAR images from each polarization channel (i.e. co-polarimetric and cross-polarimetric) to create a single image for use by downstream target detection algorithms. While achieving optimum performance in terms of a specific measurement criterion, they fail to exploit the highly specific co-polarimetric to cross-polarimetric relationship present in symmetric, man-made objects.

The present invention operates on a full-aperture SAR image, thereby maintaining the highest possible underlying image resolution. The present invention may incorporate the complex magnitude of each component image pixel, thereby enabling the exploitation of spatial averaging for reduction of pixel variability. Finally, it leverages well-established concepts of anomaly detection to "amplify" the signal from symmetric, man-made targets while leaving signals from asymmetric, natural clutter objects essentially unchanged.

POTENTIAL USES

Potential military uses include the detection of unexploded ordinances (UXOs) such as 155 shells and landmines, explosively formed penetrator (EFP), also known as an explosively formed projectile (a self-forging warhead, or a self-forging fragment), as well as general remote monitoring of the environment.

The present invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

As used herein, the terminology "symmetry" means the quality of being made up of substantially similar parts facing each other or around an axis. Alternatively, symmetry means substantially invariant to a transformation, such as for example, reflection but including other transforms too.

As used herein the terminology "point of left-right point of symmetry" means the point where substantial symmetry occurs or exists to the left and right of the "point of left-right symmetry." If the object is rotated, the axis of symmetry will rotate correspondingly.

As used herein, the terminology "polarimetric" means relating to the rotation of the plane of polarization of polarized electromagnetic waves.

As used herein, the terminology "pixel under test" means the pixel being tested or the pixel chosen to undergo review.

As used herein, the terminology "polarimetry" means the process of measuring the polarization of electromagnetic waves, such as radar waves, generally in the context of waves that have traveled through or have been reflected, diffracted or refracted by a material or object.

In polarimetric systems, pulses are transmitted and received with both horizontal and vertical polarizations. As used herein, the terminology (a) "horizontal-horizontal" or HH means horizontal transmit, horizontal receive, (b) HV, horizontally transmit, Vertical receive, (c) VV, Vertical transmit, Vertical receive, and (d) VH, Vertical transmit, Horizontal receive).

As used herein, the terminology "co-polarimetric" radar data means horizontal-horizontal," or horizontal transmit, horizontal receive, radar data, and VV, Vertical transmit, Vertical receive radar data.

As used herein the terminology cross polarimetric radar data means one or both of HV, horizontally transmit, Vertical receive and/or VH, Vertical transmit, Horizontal receive radar data.

As used herein, the terminology "patch" is a portion of the radar image.

As used herein, the term "complex magnitude" is determined by calculating the square root of the sum of the squares of the in-phase and quadrature components of the synthetic aperture radar (SAR) image pixel.

Patents, patent applications, or publications mentioned in this specification are incorporated herein by object to the same extent as if each individual document was specifically and individually indicated to be incorporated by object.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for determining the location of a man-made object based upon symmetry of the object comprising:
   at least one of a transmitter and receiver combination or transceiver for emitting and receiving mixtures of polarizations and using receiving antennas with a specific polarization to thereby collect images from radar pulses, the receiver-transmitter mixtures of polarizations comprising horizontal-horizontal polarimetric images, vertical-vertical polarimetric images, vertical-horizontal polarimetric images and horizontal-vertical polarimetric images,
   at least one processor configured to combine the horizontal-horizontal polarimetric images and vertical-vertical polarimetric images to form co-polarimetric images and operate on one or both of the vertical-horizontal polarimetric images and horizontal-vertical polarimetric images to form cross-polarimetric images;
   the at least one processor configured to process the co-polarimetric and cross-polarimetric images individually; each of the co-polarimetric and cross-polarimetric images comprising a plurality of incrementally selected pixels under test, the at least one processor configured to select a pixel under test and analyze the surrounding pixels to determine whether a manmade object is present; the at least one processor configured to perform spatial averaging using the cross polarimetric image by replacing the pixel under test and the pixels adjacent to the pixel under test with an average pixel value calculated from the pixel under test and pixels adjacent thereto;
   using the co-polarimetric image, the at least one processor configured to determine the intensity of the background of the pixel under test and the surrounding pixels in order to diminish the effect of background to produce clearer co-polarimetric and cross-polarimetric images;
   the at least one processor is configured to locate the left-right point of symmetry indicative of a man-made object by comparing each pixel under test in the cross-polarimetric image to pixels in the vicinity and if the intensity of the pixel under test differs by at least 3 dB, the pixel under test is determined to be a candidate pixel for locating a cross-range coordinate determinative of a point of symmetry indicating a man-made object.

2. The system of claim 1 wherein the at least one processor is configured to perform spatial averaging using the cross polarimetric image by replacing the pixel under test and the pixels above and below the pixel under test with an average pixel value calculated from the pixel under test and pixels located above and below the pixel under test.

3. The system of claim 1 wherein the at least one processor is configured to reduce the value of the pixel under test that is a candidate pixel for the left right point of symmetry using a normalization process using a predetermined number pixel of values in the cross-polarimetric image on both sides of the pixel under test at the left right point of symmetry to thereby reduce effects of background.

4. The system of claim 1 wherein the at least one processor determines the intensity of the background using the pixels surrounding the pixel under test and calculating an average pixel value of the surrounding pixels in order to capture a background average for pixels on either side of the point of left-right symmetry.

5. The system of claim 1 further comprising utilizing the complex magnitude of each component image pixel, thereby enabling the exploitation of spatial averaging for speckle reduction.

6. The system of claim 1 wherein the polarimetric images are polarimetric SAR images, and wherein the horizontal-horizontal polarimetric images, the vertical-vertical polarimetric images, and one or both of the vertical-horizontal polarimetric images and horizontal-vertical polarimetric images are co-registered SAR images, and wherein a location in each of the images has a corresponding location in the other co-registered SAR images.

7. The system of claim 1 wherein the at least one processor is configured to determine if the pixel under test intensity differs from the pixels in the vicinity by at least 15 dB in order to determine the pixel location of the cross-range coordinate determinative of the left-right point of symmetry.

8. The system of claim 7 wherein the at least one processor utilizes spatial averaging to compute a spatial average and the at least one processor is configured to divide the spatial average by the intensity of the background.

9. The system of claim 8 wherein the spatial average is computed using the equation:

$$I_{filter}(x, y) = \sum_{i=0}^{N_p} I(x, y - \lfloor N_p/2 \rfloor + i)$$

where $I_{filter}(x,y)$ denotes the image from either co-polarimetric or cross polarimetric radar data pixel at (x,y), where x and y are coordinates, $N_p$ is the number of pixels used for spatial averaging, and $\lfloor N_p/2 \rfloor$ denotes the largest integer less than or equal to $N_p/2$, where $N_p$ could be equal to zero for the co-polarimetric image.

10. The system of claim 8 wherein the at least one processor is configured to refine the corresponding pixel under test in the filtered co-polarimetric image by dividing by the ratio of the spatial average to the intensity of the background.

11. The system of claim 8 wherein the at least one processor, for each pixel in the filtered cross-pol image, determines the effect of background pixels in the cross polarimetric image using the equation:

$$I_{cross\ denominator}(x, y) = \sum_{i=m+1}^{M} I_{filter,cross}(x - i, y) + \sum_{i=m+1}^{M} I_{filter,cross}(x + i, y)$$

where, $I_{filter,\ cross}$ is the filtered cross-pol image and $I_{cross\ denominator}$ is used to determine the $I_{cross\ contrast}$ in the following equation where x and y are coordinates, M is the number of cross-range cells on either side of a pixel under test in the cross-polarimetric image, m is the number of guard cells on either side of the pixel under test to be skipped before calculating a background average, where m may be equal to zero, and using the image cross denominator.

12. The system of claim 11 wherein, for each pixel in the cross-pol image the at least one processor calculates the contrast between the pixel under test and any high intensity values the surrounding pixels by calculating the cross image contrast using the equation:

$$I_{cross\ contrast}(x, y) = \frac{I_{filter\ cross}(x, y)}{I_{cross\ denominator}(x, y)}$$

where $I_{filter\ cross}$ (x,y) is the filtered image at coordinates (x,y), and $I_{cross\ denominator}$ (x,y) correlates to the background intensity in the cross polarimetric image at coordinates (x,y) used as a denominator and, using the cross contrast of the surrounding pixels, the at least one processor calculates a polarimetric manmade object detector output statistic $T_{PMOD}$ using the equation:

$$T_{PMOD}(x, y) = \frac{I_{filter,co}(x, y)}{I_{cross\ contrast}(x, y)},$$

where $I_{filter,\ co}$(x,y) denotes the filtered co-pol image at coordinates (x,y).

13. The system of claim 10 wherein the at least one processor is configured to incrementally select pixels under test, determine the spatial average, determine the background intensity, use the corresponding pixel under test in the filtered co-polarimetric image and divide by the ratio of the spatial average to the intensity of the background to compile a list of statistical values indicating the likelihood of a manmade object, and compare the statistical value to the correlated value of corresponding pixel under test in the co-polarimetric image and wherein if the pixel under test value of the copolarimatric image has a larger value, it is more likely to be indicative of a manmade object.

14. The system of claim 13 wherein the at least one processor is configured to determine whether the ratio of the statistical value to the correlated value of corresponding pixel under test in the co-polarimetric image is greater than 4 dB to indicate the presence of a man-made object.

15. A method for determining the location of a man-made object comprising the following steps, not necessarily in order;

inputting image data comprising four co-registered polarimetric SAR images of a common scene; the four co-registered polarimetric images comprising horizontal-horizontal, horizontal-vertical, vertical-vertical and vertical-horizontal polarimetric images, the inputted image data comprising pixel values representing the polarimetric SAR images, a location in each of the four co-registered SAR images having a corresponding location in the other three co-registered SAR images;

each of the four co-registered SAR images being inputted into at least one processor, the at least one processor being configured to calculate a statistic indicating the likelihood that a manmade object is present by selecting a pixel under test and:

(i) using at least one processor, spatial averaging at a plurality of pixel locations in the vicinity of the pixel under test using the equation:

$$I_{filter}(x, y) = \sum_{i=0}^{N_p} I(x, y - \lfloor N_p/2 \rfloor + i)$$

where I(x,y) denotes the image from either co-polarimetric or cross polarimetric radar data at pixel (x,y), where x and y are coordinates, $N_p$ is the number of pixels used for spatial averaging, and $\lfloor N_p/2 \rfloor$ denotes the largest integer less than or equal to $N_p/2$, where $N_p$ could be equal to zero for the co-polarimetric image;

(ii) capturing a background average by determining the number of cross-range cells (M) on either side of a pixel under test in the cross-pol image to calculate a background average for pixels on either side of the point of left-right symmetry and then specifying m, the number of "guard" cells on either side of the pixel under test to be "skipped" before calculating this background average, where m could be equal to zero;

(iii) for each pixel in the filtered cross-pol image, calculating the quantity:

$$I_{cross\ denominator}(x, y) = \sum_{i=m+1}^{M} I_{filter,cross}(x - i, y) + \sum_{i=m+1}^{M} I_{filter,cross}(x + i, y)$$

where, $I_{filter,\ cross}$ is the filtered cross-pol image and $I_{cross\ denominator}$ is used to determine the $I_{cross\ contrast}$ in the following equation;

(iv) for each pixel in the cross-pol image calculating the quantity:

$$I_{cross\ contrast}(x, y) = \frac{I_{filter,cross}(x, y)}{I_{cross\ denominator}(x, y)}$$

(v) calculating a polarimetric manmade object detector output statistic $T_{PMOD}$ using the equation:

$$T_{PMOD}(x, y) = \frac{I_{filter,co}(x, y)}{I_{cross\ contrast}(x, y)},$$

where $I_{filter,\ co}$(x,y) denotes the filtered co-pol image;

(vi) processing the image (two-dimensional array) of polarimetric manmade object output detector values to determine if the object under investigation is manmade.

16. The method of claim 15 further comprising utilizing the complex magnitude of each component image pixel, thereby enabling the exploitation of spatial averaging for speckle reduction.

17. A system for determining the location of a man-made object comprising:
- at least one input configured to input image data comprising four co-registered SAR images of a common scene, each scene comprising a plurality of pixel values, the pixel values representing a radar cross section of the same region in each of the four basis polarizations;
- at least one processor, each of the four co-registered SAR images being inputted into the at least one processor, the at least one processor being configured to calculate a statistical likelihood that a manmade object is present; the at least one processor configured to perform spatial averaging at a plurality of pixel locations according to the equation:

$$I_{filter}(x, y) = \sum_{i=0}^{N_p} I(x, y - \lfloor N_p/2 \rfloor + i)$$

where $I(x,y)$ denotes the image from either co-polarimetric or cross polarimetric radar data at pixel $(x,y)$, $N_p$ is the number of pixels used for spatial averaging, and $\lfloor N_p/2 \rfloor$ denotes the largest integer less than or equal to $N_p/2$, and $N_p$ possibly equal to zero for the co-polarimetric image;
- the at least one processor configured to determine M, the number of cross-range cells on either side of a pixel under test in the cross-pol image in order to capture a background average for pixels on either side of the point of left-right symmetry;
- the at least one processor configured to determine the number (m) of "guard" cells on either side of the pixel under test to be "skipped" before calculating this background average, where m may be equal to zero;
- the at least one processor configured to calculate for each pixel in the filtered cross-polarimetric image the quantity:

$$I_{cross\ denominator}(x, y) = \sum_{i=m+1}^{M} I_{filter,cross}(x - i, y) + \sum_{i=m+1}^{M} I_{filter,cross}(x + i, y)$$

where, $I_{filter,\ cross}$ is the filtered cross-polarimetric image;
- the at least one processor configured to, for each pixel in the cross-pol image, calculate the quantity:

$$I_{cross\ contrast}(x, y) = \frac{I_{filter,cross}(x, y)}{I_{cross\ denominator}(x, y)};$$

- the at least one processor configured to calculate a polarimetric manmade object detector output statistic using the equation:

$$T_{PMOD}(x, y) = \frac{I_{filter,co}(x, y)}{I_{cross\ contrast}(x, y)},$$

where $I_{filter,\ co}(x,y)$ denotes the filtered co-polarimetric image; and
- the at least one processor configured to create a two-dimensional array of values to determine if the object under investigation is man-made.

18. The system of claim 17 further comprising utilizing the complex magnitude of each component image pixel, thereby enabling the exploitation of spatial averaging for speckle reduction.

\* \* \* \* \*